(12) United States Patent
Zheng (10) Patent No.: US 12,274,235 B1
(45) Date of Patent: Apr. 15, 2025

(54) COMBINED PET PAD INCLUDING A CLAMPED SEALING COVER

(71) Applicant: Weijun Zheng, Puning (CN)

(72) Inventor: Weijun Zheng, Puning (CN)

( * ) Notice: Subject to any disclaimer, the term of this patent is extended or adjusted under 35 U.S.C. 154(b) by 0 days.

(21) Appl. No.: 18/784,712

(22) Filed: Jul. 25, 2024

(30) Foreign Application Priority Data

Jul. 17, 2024 (CN) .......................... 202421692032.8

(51) Int. Cl.
*A01K 1/01* (2006.01)

(52) U.S. Cl.
CPC .................................. *A01K 1/0107* (2013.01)

(58) Field of Classification Search
CPC ............................ B26D 7/025; E04F 15/02038
See application file for complete search history.

(56) References Cited

U.S. PATENT DOCUMENTS

| | | | | |
|---|---|---|---|---|
| 4,147,129 A * | 4/1979 | Ruplen | ................ | A01K 1/0353 119/28.5 |
| 8,220,622 B1 * | 7/2012 | Lewis | ................ | A01K 1/0107 119/168 |
| 9,737,045 B1 * | 8/2017 | Scanlan | ................ | A01K 1/011 |
| 11,330,792 B1 * | 5/2022 | Van Ness | ............. | A01K 1/0157 |
| 2020/0113364 A1 * | 4/2020 | King | ................... | A47G 27/0412 |
| 2020/0178490 A1 * | 6/2020 | Taylor | ................. | A01K 1/0107 |
| 2021/0360894 A1 * | 11/2021 | Miwa | .................... | A01K 1/0107 |

FOREIGN PATENT DOCUMENTS

| | | |
|---|---|---|
| CN | 209234600 U | 8/2019 |
| CN | 210959852 U | 7/2020 |
| CN | 219741496 U | 9/2023 |

\* cited by examiner

*Primary Examiner* — Brady W Frazier
*Assistant Examiner* — Alanna K Peterson
(74) *Attorney, Agent, or Firm* — George D. Morgan (57) ABSTRACT

The present invention discloses a combined pet pad, including: two first combined pads and two second combined pads that are diagonally disposed respectively, where each of the first combined pads is detachably connected to the two second combined pads in a clamping manner respectively; and a sealing cover that is detachably disposed on an intersectant connecting part in sealing and clamping manners after the two first combined pads and the two second combined pads are spliced, where both the first combined pad and the second combined pad include: a support body, where a plurality of support strips are disposed in the support body; and a clamping member that is rotatably disposed on the support body, where the clamping member is detachably connected to the support body in a clamping manner.

13 Claims, 10 Drawing Sheets

COMBINED PET PAD INCLUDING A CLAMPED SEALING COVER

CROSS-REFERENCE TO RELATED APPLICATIONS

The application claims priority to Chinese patent application No. 2024216920328, filed on Jul. 17, 2024, the entire contents of which are incorporated herein by reference.

TECHNICAL FIELD

The present invention relates to the technical field of pet products, and in particular, to a combined pet pad.

BACKGROUND

An existing combined pet pad is generally formed by splicing pads of same or similar structures together. Due to an edge design problem of the pads, when the pads are combined and spliced, there may be a gap between two pads, resulting in easy leakage of excrement of a pet, so that the environment is polluted and it is difficult to clean the excrement. In the prior art, a urine-absorbing cloth liner is generally placed on a combined pet pad directly and is not fixed, so that the pet easily separates the urine-absorbing cloth liner from the combined pet pad and directly excretes the excrement on the combined pet pad, and a user needs to perform additional cleaning, resulting in poor experience of the user. Therefore, a combined pet pad is provided to solve the above problem.

SUMMARY

A purpose of the present invention is to provide a combined pet pad, so as to solve a problem that an existing combined pet pad is poor in sealing performance and cannot fix a urine-absorbing cloth liner.

A combined pet pad of the present invention may be implemented through the following technical solutions:

The combined pet pad of the present invention includes: two first combined pads, where the two first combined pads are disposed diagonally; two second combined pads, where the two second combined pads are disposed diagonally, and each of the first combined pads is detachably connected to the two second combined pads in a clamping manner respectively; and a sealing cover, where the sealing cover is detachably disposed on an intersectant connecting part in sealing and clamping manners after the two first combined pads and the two second combined pads are spliced.

Both the first combined pad and the second combined pad include: a support body, where the support body is a hollow cavity with edges disposed on four sides, a plurality of support strips are disposed in the support body, and the support strips support a urine-absorbing cloth liner disposed on the support strips; and a clamping member rotatably disposed on a side edge of the support body, where the clamping member is detachably connected to the support body in a clamping manner, to fix the urine-absorbing cloth liner.

In an implementation, a gap is formed between two adjacent support strips, and a gap is also formed between the plurality of support strips and the edges of the support body respectively, to accommodate urine of a pet.

In an implementation, the first combined pad includes a first support body and a first clamping member, and the first clamping member is detachably connected to a side edge of the first support body in a clamping manner; and the second combined pad includes a second support body and a second clamping member, and the second clamping member is detachably connected to a side edge of the second support body in a clamping manner.

In an implementation, an edge, corresponding to the sealing cover, of the first support body is provided with a first connecting portion of a circular arc shape, and two ends of the first connecting portion are provided with mounting notches respectively; and an edge, corresponding to the sealing cover, of the second support body is provided with a second connecting portion of a circular arc shape, two ends of the second connecting portion are provided with mounting tables respectively, and two mounting notches can be detachably disposed on corresponding mounting tables in a clamping manner respectively.

In an implementation, the side edge of the first support body is symmetrically provided with two rotating shaft holes; and rotating shafts are symmetrically disposed at two ends of the first clamping member, and two rotating shafts are movably disposed in corresponding rotating shaft holes respectively.

In an implementation, a clamping table is disposed on the first support body; and a position, corresponding to the clamping table, of the first clamping member is provided with a plurality of clamping blocks, and the plurality of clamping blocks can be detachably connected to the clamping table in a clamping manner.

In an implementation, the first clamping member, the two rotating shafts, and the plurality of clamping blocks are integrally formed.

In an implementation, the two ends of the first connecting portion are provided with streamline clamping grooves in a connecting manner respectively; and the two ends of the second connecting portion are provided with clamping edges in a connecting manner respectively, two clamping grooves are detachably disposed on corresponding clamping edges in a clamping manner respectively, and the clamping grooves wrap the corresponding clamping edges.

In an implementation, connecting parts in which the first connecting portion is connected to the two clamping grooves are obliquely provided with liquid guide grooves respectively.

In an implementation, the sealing cover is provided with an inner ring and an outer ring, an annular clamping groove is formed between the inner ring and the outer ring, and the annular clamping groove is detachably disposed on an intersectant connecting part in a clamping manner after the two first combined pads and the two second combined pads are spliced.

In an implementation, the outer ring is symmetrically provided with four clamping holes, and the four clamping holes are detachably disposed above corresponding mounting notches in a clamping manner respectively.

In an implementation, a plurality of reinforcing ribs are disposed in the inner ring, and the plurality of reinforcing ribs enhance strength of the sealing cover.

In an implementation, at least one foot pad is disposed on both bottom portions of the first combined pad and the second combined pad, and a plurality of foot pads increase frictional force between ground and the first combined pad and the second combined pad.

In an implementation, the foot pad is made of plastic or rubber.

In an implementation, the urine-absorbing cloth liner is a disposable urine-absorbing cloth liner.

Compared with the prior art, beneficial effects of the combined pet pad of the present invention are as follows:

According to the combined pet pad of the present invention, the first combined pad and the second combined pad are spliced, and then the sealing cover seals the intersectant connecting part after the two first combined pads and the two second combined pads are spliced, thereby implementing sealing performance of the combined pet pad; a plurality of clamping members are matched to fix the urine-absorbing cloth liner, thereby effectively solving a problem that an existing combined pet pad cannot fix the urine-absorbing cloth liner; and at the same time, a position, in contact with the sealing cover, of the first combined pad is provided with the liquid guide groove, so that the urine, falling onto the sealing cover, of the pet can be guided into the corresponding first combined pad and second combined pad along the liquid guide groove, thereby enhancing sealing performance of the combined pet pad to a certain extent.

BRIEF DESCRIPTION OF THE DRAWINGS

To describe the technical solutions in the embodiments of the present invention more clearly, the following briefly describes the accompanying drawings required for describing the embodiments. It should be understood that, the following accompanying drawings show merely some embodiments of the present invention, and therefore should not be regarded as a limitation on the scope. Those of ordinary skill in the art may still derive other related drawings from these accompanying drawings without creative efforts.

Reference numerals in the drawing: 10. combined pet pad; 11. first combined pad; 111. first support body; 1111. first support strip; 1112. rotating shaft hole; 1113. clamping table; 1114. first connecting portion; 11141. mounting notch; 11142. liquid guide groove; 1115. clamping groove; 112. first clamping member; 1121. rotating shaft; 1122. clamping block; 12. second combined pad; 121. second support body; 1211. second support strip; 1212. second connecting portion; 12121. mounting table; 1213. clamping edge; 122. second clamping member; 13. sealing cover; 131. inner ring; 1311. reinforcing rib; 132. outer ring; 1321. clamping hole; 133. annular clamping groove; 14. foot pad; 20. urine-absorbing cloth liner.

DETAILED DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. Generally, the components of the embodiments of the present invention described and shown in the accompanying drawings herein may be arranged and designed in a variety of different configurations.

Therefore, the following detailed descriptions of the embodiments of the present invention provided in the accompanying drawings are not intended to limit the scope of the present invention, but merely represent selected embodiments of the present invention. Based on the embodiments in the present invention, all other embodiments obtained by those of ordinary skill in the art without making creative labor fall within the scope of protection of the present invention.

Referring to FIG. 1 to FIG. 10, a urine-absorbing cloth liner 20 is detachably disposed on a combined pet pad 10 of the present invention in a fixing manner; the combined pet pad 10 mainly includes two first combined pads 11, two second combined pads 12, and a sealing cover 13; the two first combined pads 11 and the two second combined pads 12 are diagonally disposed respectively, and each of the first combined pads 11 is detachably connected to the two second combined pads 12 respectively; and the sealing cover 13 is detachably disposed on a connecting part between the two first combined pads 11 and the two second combined pads 12 in a sealing manner, so that the connecting part between the two first combined pads 11 and the two second combined pads 12 is connected in a sealing manner, and urine of a pet is prevented from leaking from the connecting part. In the embodiment, at least one foot pad 14 is disposed on both bottom portions of the first combined pad 11 and the second combined pad 12, thereby effectively increasing frictional force between ground and the first combined pad and the second combined pad. Specifically, the foot pad 14 may be made of plastic or rubber; preferably, the foot pad 14 is made of silica gel; and the urine-absorbing cloth liner 20 is a disposable urine-absorbing cloth liner, thereby facilitating cleaning by a user.

Referring to FIG. 1 to FIG. 6, in the embodiment, the first combined pad 11 includes a first support body 111 and a first clamping member 112; the first support body 111 is a hollow cavity with edges disposed on four sides, a plurality of first support strips 1111 are disposed in the first support body, the first support strips 1111 support the urine-absorbing cloth liner 20 disposed on the first support strips, a gap is formed between two adjacent first support strips 1111, and a gap is also formed between the plurality of first support strips 1111 and the edges of the first support body 111 respectively, thereby facilitating accommodating the urine of the pet; and the first clamping member 112 is rotatably disposed on a side edge of the first support body 111 and can be detachably connected to the first support body 111 in a clamping manner, thereby fixing the urine-absorbing cloth liner 20 to the first combined pad 11.

Referring to FIG. 4 to FIG. 7, in the embodiment, the side edge of the first support body 111 is symmetrically provided with two rotating shaft holes 1112, and two ends of the first clamping member 112 are movably disposed in corresponding rotating shaft holes 1112 respectively, so that the first clamping member 112 can rotate relative to the first support body 111; a position, corresponding to the first clamping member 112, of the first support body 111 is provided with a clamping table 1113, and the first clamping member 112 can be detachably clamped on the clamping table 1113, thereby fixing the urine-absorbing cloth liner 20 between the first clamping member 112 and the clamping table 1113; an edge, corresponding to the sealing cover 13, of the first support body 111 is provided with a first connecting portion 1114, and the first connecting portion is of a circular arc shape, thereby facilitating detachably connecting to the sealing cover 13 of a cylinder shape in a clamping manner; and specifically, two ends of the first connecting portion 1114 are provided with mounting notches 11141 respectively, and two mounting notches 11141 can be detachably disposed on corresponding second combined pads 12 in a clamping manner respectively. The two ends of the first connecting portion 1114 are provided with streamline clamping grooves 1115 in a connecting manner respectively, and two clamping grooves 1115 can be detachably disposed on corresponding edges of the second combined pads 12 in a clamping manner respectively, so that the first combined pad 11 is detachably spliced with the two second combined pads 12 respectively, and the clamping grooves 1115 wrap the corresponding edges of the second combined pads 12 at the same time, thereby enhancing sealing connection between the first combined pad 11 and the second combined pad 12. Specifically, connecting parts in which the first connecting portion 1114 is connected to the two clamping grooves 1115 respectively are provided with liquid guide grooves 11142, so that the urine, falling onto the sealing cover 13, of the pet can be guided into corresponding first combined pad 11 and second combined pad 12 along the liquid guide groove 11142, thereby enhancing sealing performance of the combined pet pad 10 to a certain extent. Preferably, the liquid guide groove 11142 is disposed obliquely, thereby facilitating guiding the urine, flowing down from the sealing cover 13, of the pet into the corresponding first combined pad 11 and second combined pad 12 along the liquid guide groove 11142 with an inclined angle.

Referring to FIG. 1, FIG. 2, FIG. 4, and FIG. 5, in the embodiment, the first clamping member 112 is a clamping handle, rotating shafts 1121 are symmetrically disposed at two ends of the first clamping member, and two rotating shafts 1121 are movably disposed in corresponding rotating shaft holes 1112 respectively, so that the first clamping member 112 can rotate relative to the first support body 111; and a position, corresponding to the clamping table 1113, of the first clamping member 112 is provided with a plurality of clamping blocks 1122, and the plurality of clamping blocks 1122 can be detachably connected to the clamping table 1113 in a clamping manner, thereby fixing the urine-absorbing cloth liner 20 between the first support body 111 and the first clamping member 112. Specifically, the first clamping member 112, the two rotating shafts 1121, and the plurality of clamping blocks 1122 are integrally formed.

Referring to FIG. 2, FIG. 3, FIG. 4, and FIG. 8, in the embodiment, the second combined pad 12 includes a second support body 121 and a second clamping member 122; the second support body 121 is a hollow cavity with edges disposed on four sides, a plurality of second support strips 1211 are disposed in the second support body, the second support strips 1211 support the urine-absorbing cloth liner 20 disposed on the second support strips, a gap is formed between two adjacent second support strips 1211, and a gap is also formed between the plurality of second support strips 1211 and the edges of the second support body 121 respectively, thereby facilitating accommodating the urine of the pet; the second clamping member 122 is rotatably disposed on a side edge of the second support body 121 and can be detachably connected to the second support body 121 in a clamping manner, thereby fixing the urine-absorbing cloth liner 20 to the second combined pad 12; and specifically, structures of the second clamping member 122 and the first clamping member 112 are the same, and specific structure of the second clamping member is not described in detail herein again.

Figure 1:
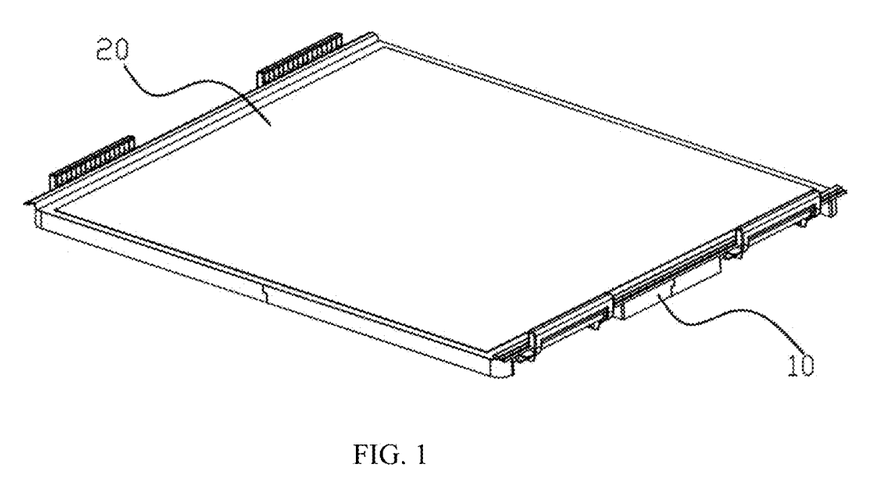
FIG. 1 is a schematic diagram of a use scenario of a combined pet pad of the present invention.
Figure 2:
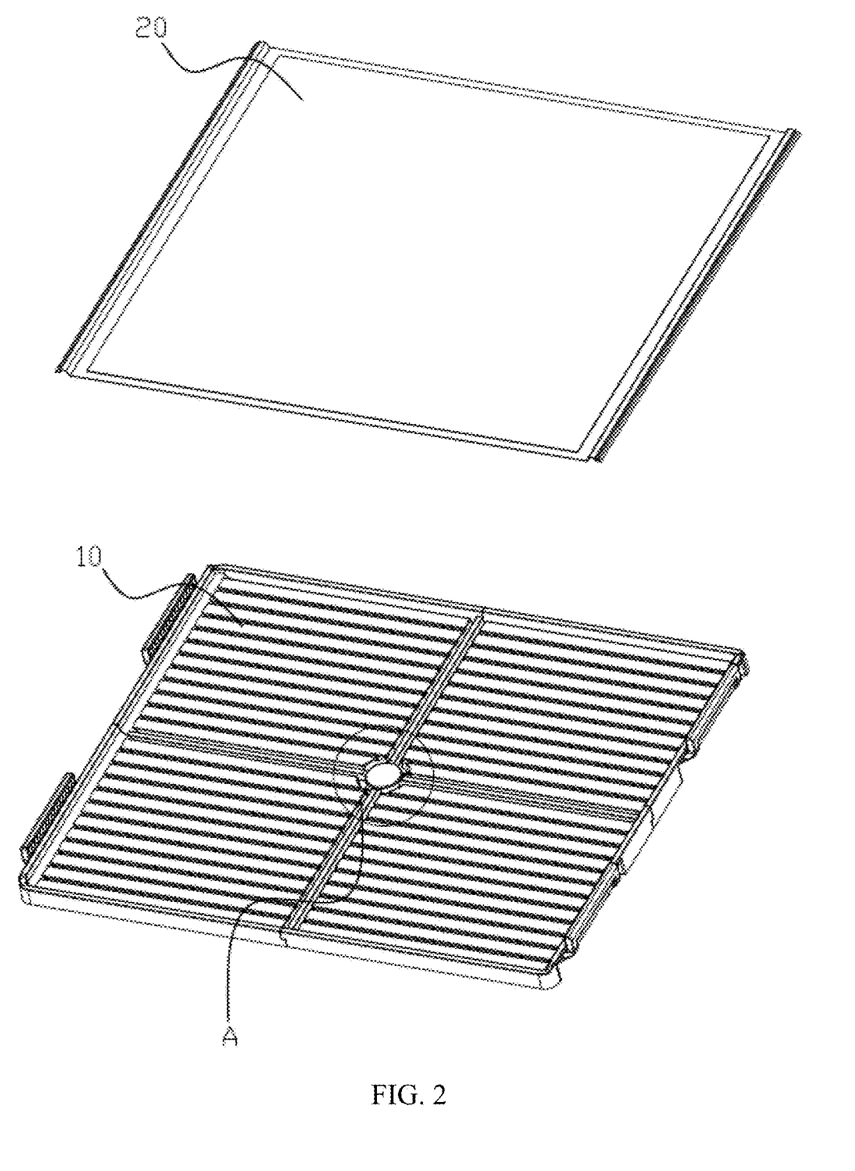
FIG. 2 is a schematic structural exploded view of a combined pet pad of the present invention under a use state shown in FIG. 1.
Figure 3:
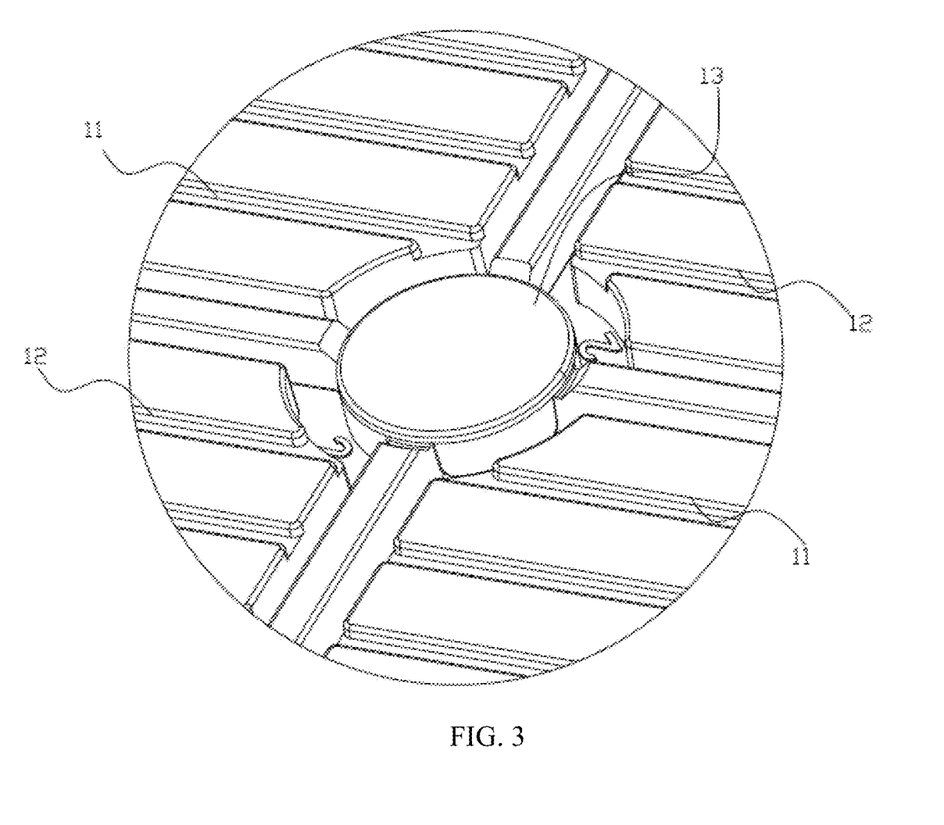
FIG. 3 is a schematic enlarged view of a position A shown in FIG. 2.
Figure 4:
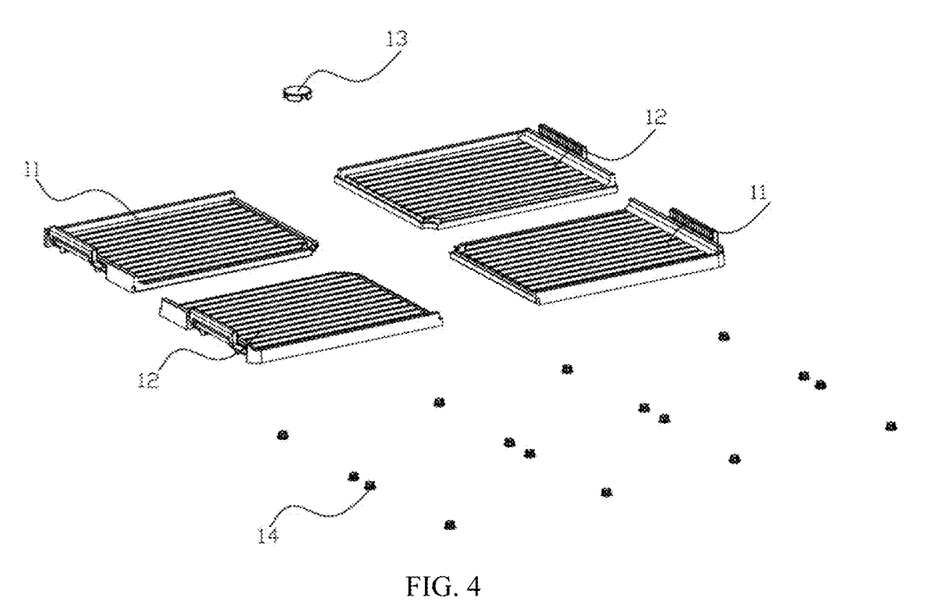
FIG. 4 is a schematic structural exploded view of a combined pet pad of the present invention, including a first combined pad, a second combined pad, and a sealing cover.
Figure 5:
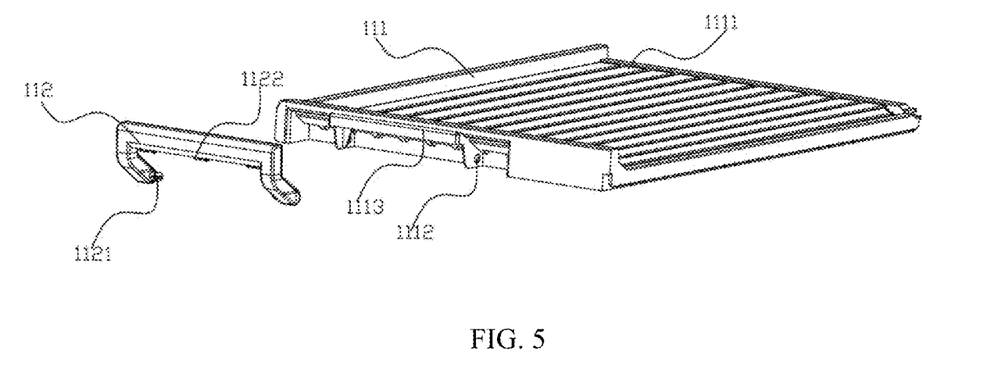
FIG. 5 is a schematic structural exploded view of a first combined pad shown in FIG. 4, including a first support body.
Figure 6:
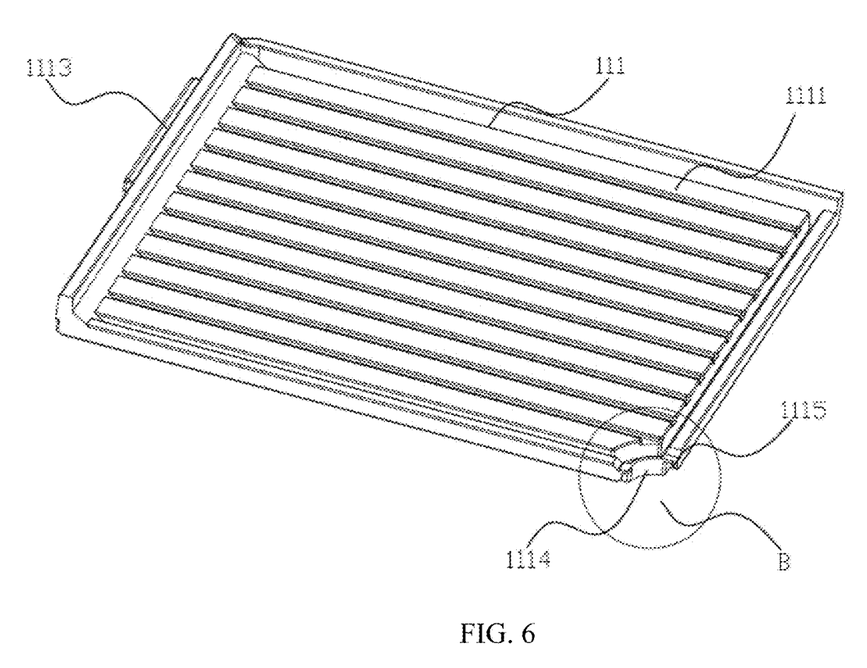
FIG. 6 is a schematic structural diagram of a first support body shown in FIG. 5.
Figure 7:
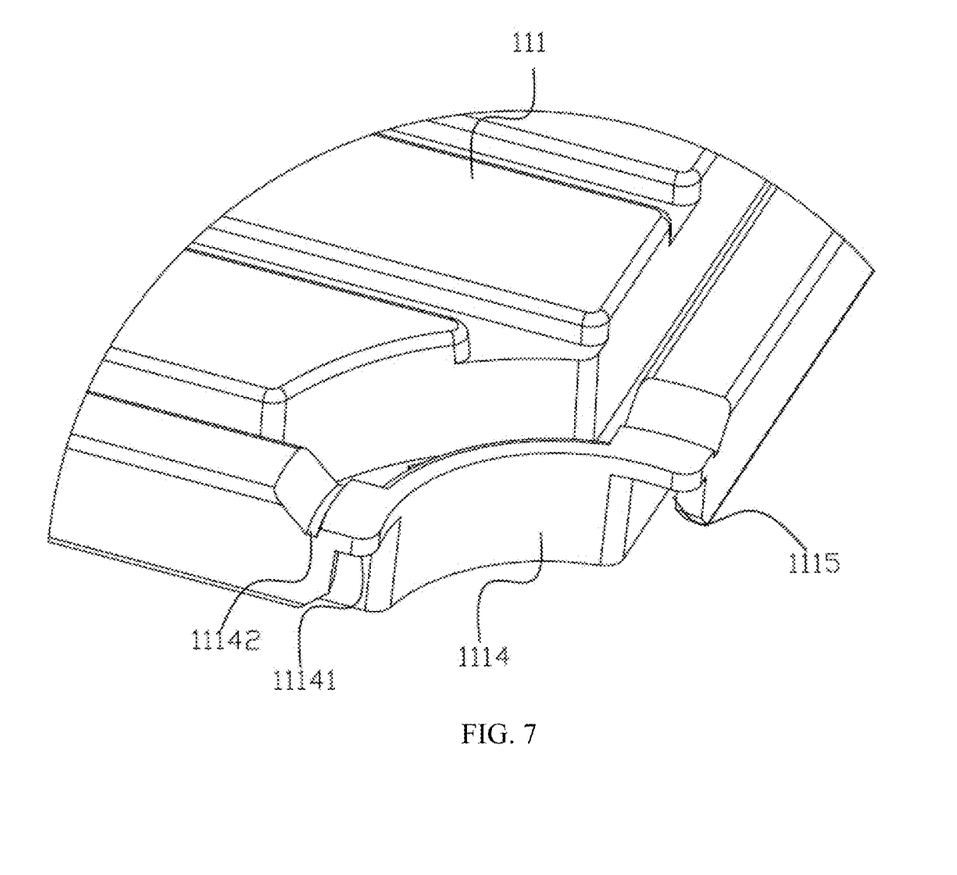
FIG. 7 is a schematic enlarged view of a position B shown in FIG. 6.
Figure 8:
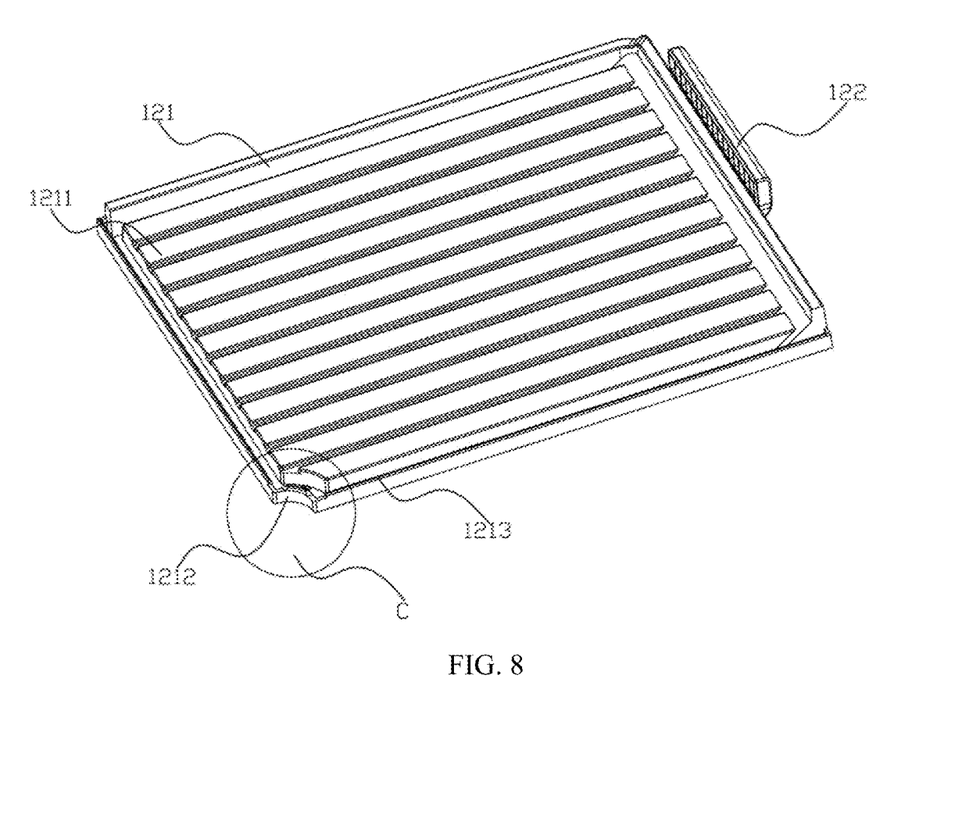
FIG. 8 is a schematic structural diagram of a second combined pad shown in FIG. 4.
Figure 9:
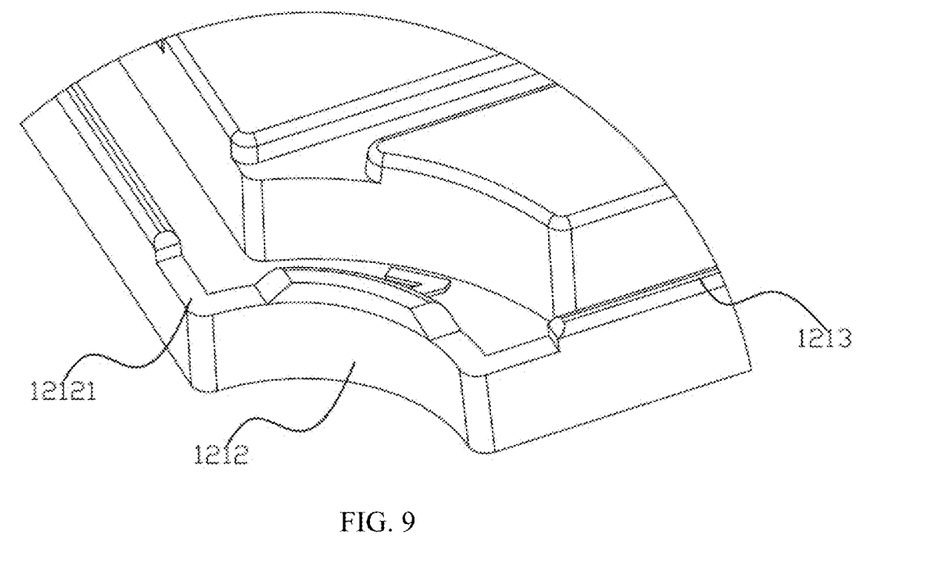
FIG. 9 is a schematic enlarged view of a position C shown in FIG. 8.
Figure 10:
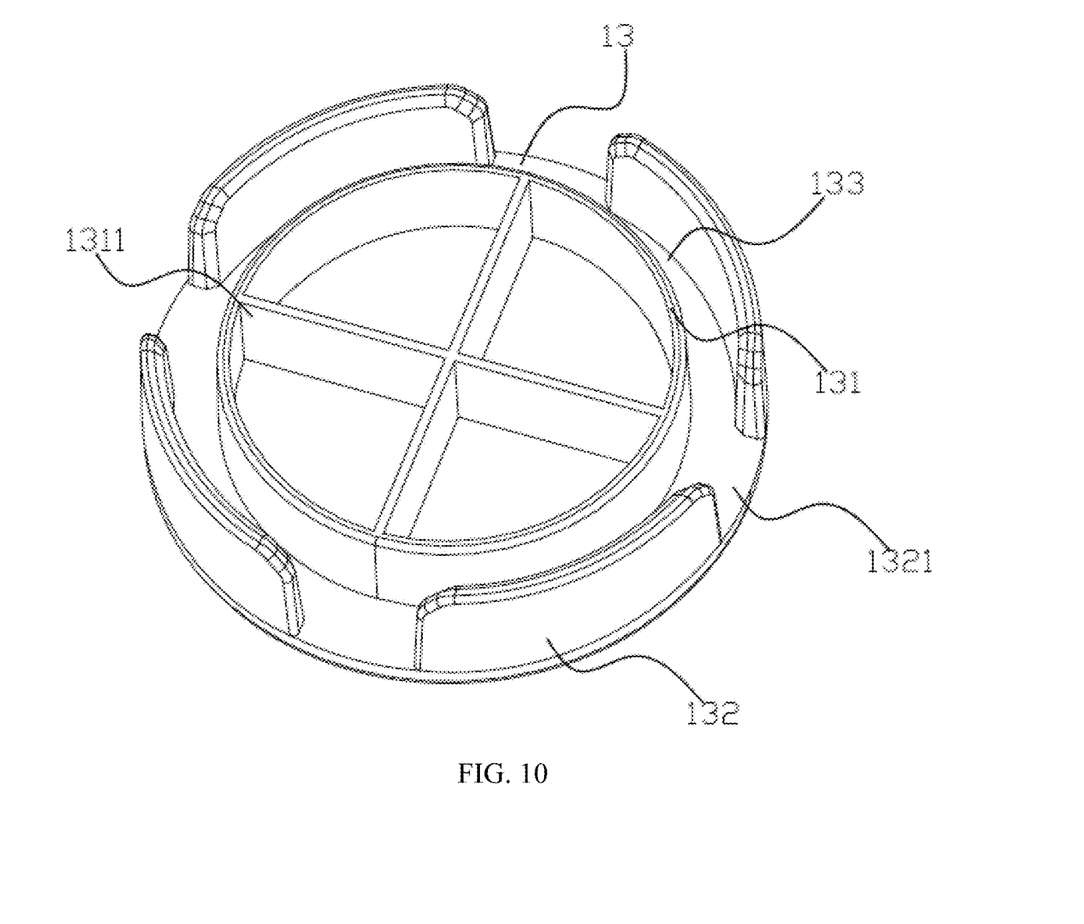
FIG. 10 is a schematic structural diagram of a sealing cover shown in FIG. 5.

Referring to FIG. 8 and FIG. 9, in the embodiment, an edge, corresponding to the sealing cover 13, of the second support body 121 is provided with a second connecting portion 1212, and the second connecting portion is of a circular arc shape, thereby facilitating detachably connecting to the sealing cover 13 of a cylinder shape in a clamping manner; and specifically, two ends of the second connecting portion 1212 are provided with mounting tables 12121 respectively, and the two mounting notches 11141 can be detachably disposed on corresponding mounting tables 12121 in a clamping manner respectively. The two ends of the second connecting portion 1212 are provided with clamping edges 1213 in a connecting manner respectively, and the two clamping grooves 1115 can be detachably disposed on corresponding clamping edges 1213 in a clamping manner respectively, so that the first combined pad 11 is detachably spliced with the two second combined pads 12 respectively, and the clamping grooves 1115 wrap the corresponding clamping edges 1213 at the same time, thereby enhancing sealing connection between the first combined pad 11 and the second combined pad 12.

Referring to FIG. 2, FIG. 3, FIG. 4, and FIG. 10, in the embodiment, the sealing cover 13 is of a cylinder shape and is detachably clamped on four clamping grooves 1115; and the sealing cover 13 is provided with an inner ring 131 and an outer ring 132, an annular clamping groove 133 is formed between the inner ring and the outer ring, and the annular clamping groove 133 is detachably disposed on an intersectant connecting part in a clamping manner after the two first combined pads 11 and the two second combined pads 12 are spliced. Specifically, a plurality of reinforcing ribs 1311 are disposed in the inner ring 131, and strength of the sealing cover 13 is enhanced through the plurality of reinforcing ribs 1311; and the outer ring 132 is symmetrically provided with four clamping holes 1321, and the four clamping holes 1321 are detachably clamped above corresponding mounting notches 11141 respectively and limit and guide the sealing cover 13.

It should be noted that, a specific assembly process of the combined pet pad 10 of the present invention is as follows: two clamping grooves 1115 on one first combined pads 11 are respectively disposed, in a clamping manner, on corresponding clamping edges 1213 of two second combined pads 12 disposed diagonally; then two clamping grooves 1115 on the other first combined pad 11 are respectively disposed on corresponding clamping edges 1213 of two second combined pads 12 in a clamping manner, and then the sealing cover 13 is disposed on four clamping grooves 1115 in a clamping manner, thereby completing splicing the combined pet pad 10; and then the urine-absorbing cloth liner 20 is clamped on the combined pet pad 10 through two first clamping members 112 and two second clamping members 122.

The technical features of the above embodiments can be combined in any way. To simplify the description, not all possible combinations of the technical features in the embodiments are described. However, as long as there is no contradiction in the combinations of these technical features, all possible combinations should be considered to fall within the scope of the specification.

The above embodiments only represent several implementations of the present invention, and the description thereof is relatively specific and detailed but should not be construed as limiting the scope of the present invention. It should be noted that for those of ordinary skill in the art, several modifications and improvements can be made without departing from the concept of the present invention and these modifications and improvements should all fall within the protection scope of the present invention. Therefore, the protection scope of the present invention shall be subject to the appended claims.

What is claimed is:

1. A combined pet pad, comprising:
   two first combined pads, wherein the two first combined pads are disposed diagonally;
   two second combined pads, wherein the two second combined pads are disposed diagonally, and each of the first combined pads is detachably connected to the two second combined pads in a clamping manner respectively; and
   a sealing cover, wherein the sealing cover is detachably disposed on an intersectant connecting part in a clamping manner after the two first combined pads and the two second combined pads are spliced, wherein
   each first combined pad comprises:
      a first support body, wherein the first support body is a hollow cavity with edges disposed on four sides, a plurality of first support strips are disposed in the first support body, and the plurality of first support strips support a part, disposed on the plurality of first support strips, of a urine-absorbing cloth liner; and
      a first clamping member rotatably disposed on a side edge of the first support body, wherein the first clamping member is detachably connected to the first support body in a clamping manner, to fix the part, disposed on the plurality of first support strips, of the urine-absorbing cloth liner; and
   each second combined pad comprises:
      a second support body, wherein the second support body is a hollow cavity with edges disposed on four sides, a plurality of second support strips are disposed in the second support body, and the plurality of second support strips support a part, disposed on the plurality of second support strips, of the urine-absorbing cloth liner; and
      a second clamping member rotatably disposed on a side edge of the second support body, wherein the second clamping member is detachably connected to the second support body in a clamping manner, to fix the part, disposed on the plurality of second support strips, of the urine-absorbing cloth liner,
   wherein an edge, corresponding to the sealing cover, of the first support body is provided with a first connecting portion of a circular arc shape, and two ends of the first connecting portion are provided with mounting notches respectively; and an edge, corresponding to the sealing cover, of the second support body is provided with a second connecting portion of a circular arc shape, and two ends of the second connecting portion are provided with mounting tables respectively; and two mounting notches can be detachably disposed on corresponding mounting tables in a clamping manner respectively.

2. The combined pet pad according to claim 1, wherein a gap is formed between two adjacent first support strips, and a gap is also formed between the plurality of first support strips and the edges of the first support body respectively, to accommodate urine of a pet; and
   a gap is formed between two adjacent second support strips, and a gap is also formed between the plurality of second support strips and the edges of the second support body respectively, to accommodate urine of a pet.

3. The combined pet pad according to claim 1, wherein the side edge of the first support body is symmetrically provided with two rotating shaft holes; and rotating shafts are symmetrically disposed at two ends of the first clamping member, and the two rotating shafts are movably disposed in the corresponding rotating shaft holes respectively.

4. The combined pet pad according to claim 3, wherein a clamping table is disposed on the first support body; and a part, corresponding to the clamping table, of the first clamping member is provided with a plurality of clamping blocks, and the plurality of clamping blocks can be detachably connected to the clamping table in a clamping manner.

5. The combined pet pad according to claim 4, wherein the first clamping member, the two rotating shafts, and the plurality of clamping blocks are integrally formed.

6. The combined pet pad according to claim 1, wherein the two ends of the first connecting portion are provided with streamline clamping grooves in a connecting manner respectively; and the two ends of the second connecting portion are provided with clamping edges in a connecting manner respectively, two clamping grooves are detachably disposed on corresponding clamping edges in a clamping manner respectively, and the clamping grooves wrap the corresponding clamping edges.

7. The combined pet pad according to claim 6, wherein each first connecting portion is provided with a liquid guide groove, and the liquid guide groove is disposed obliquely to the clamping groove.

8. The combined pet pad according to claim 1, wherein the sealing cover is provided with an inner ring and an outer ring, an annular clamping groove is formed between the inner ring and the outer ring, and the annular clamping groove is detachably disposed on an intersectant connecting part in a clamping manner after the two first combined pads and the two second combined pads are spliced.

9. The combined pet pad according to claim 8, wherein the outer ring is symmetrically provided with four clamping holes, and the four clamping holes are detachably disposed above corresponding mounting notches in a clamping manner respectively.

10. The combined pet pad according to claim 8, wherein a plurality of reinforcing ribs are disposed in the inner ring, and the plurality of reinforcing ribs enhance strength of the sealing cover.

11. The combined pet pad according to claim 1, wherein at least one foot pad is disposed on a bottom portion of each of the first combined pad and the second combined pad, and the at least one foot pad increases frictional force between ground and the bottom portion of each of the first combined pad and the second combined pad.

12. The combined pet pad according to claim 11, wherein the at least one foot pad is made of plastic or rubber.

13. The combined pet pad according to claim 1, wherein the urine-absorbing cloth liner is a disposable urine-absorbing cloth liner.

* * * * *